United States Patent [19]

Carlson et al.

[11] 4,168,245

[45] Sep. 18, 1979

[54] PREPARATION OF A SUPPORTED METAL PHTHALOCYANINE CATALYST

[75] Inventors: David H. J. Carlson, Park Ridge; James R. Deering, Prospect Heights, both of Ill.

[73] Assignee: UOP Inc., Des Plaines, Ill.

[21] Appl. No.: 911,605

[22] Filed: Jun. 1, 1978

Related U.S. Application Data

[63] Continuation-in-part of Ser. No. 820,472, Aug. 1, 1977, Pat. No. 4,100,057.

[51] Int. Cl.$^2$ .......................... B01J 31/12; B01J 27/24
[52] U.S. Cl. ............................ 252/431 N; 252/438; 208/206
[58] Field of Search ............................ 252/431 N, 438

[56] References Cited

U.S. PATENT DOCUMENTS

| | | | |
|---|---|---|---|
| 2,983,674 | 5/1961 | Bauer | 208/206 X |
| 3,097,158 | 7/1963 | Gleim | 208/206 X |
| 3,408,287 | 10/1968 | Urban et al. | 208/207 |
| 3,692,842 | 9/1972 | Massie | 252/431 N X |

*Primary Examiner*—Delbert E. Gantz
*Assistant Examiner*—William G. Wright
*Attorney, Agent, or Firm*—James R. Hoatson, Jr.; Robert W. Welch; William H. Page, II

[57] ABSTRACT

A method of preparing a supported metal phthalocyanine catalyst is disclosed. A metal phthalocyanine is impregnated on a solid adsorptive support from an aqueous impregnating solution or dispersion of said metal phthalocyanine containing from about 5 to about 50 wt. ppm. morpholine. The prepared catalyst is particularly useful in the treatment of a sour petroleum distillate or fraction.

9 Claims, No Drawings

PREPARATION OF A SUPPORTED METAL PHTHALOCYANINE CATALYST

CROSS-REFERENCE TO RELATED APPLICATIONS

This application is a continuation-in-part of a copending application Ser. No. 820,472 filed Aug. 1, 1977 now U.S. Pat. No. 4,100,057.

This invention relates to a novel method of preparing a supported metal phthalocyanine catalyst particularly useful in the treatment of a sour petroleum distillate or fraction, the treatment being commonly referred to as sweetening. Processes for the treatment of sour petroleum distillates, wherein the distillate is passed in contact with a supported metal phthalocyanine catalyst, have become well-known and widely practiced in the petroleum refining industry. The treating process is typically designed to effect the catalytic oxidation of offensive mercaptans contained in a sour petroleum distillate, thereby converting said mercaptans to innocuous disulfides. The oxidizing agent is most often air which is admixed with the distillate to be treated. Gasoline, including natural, straight-run and cracked gasolines, is one of the most frequently treated petroleum distillates. Others include the normally gaseous petroleum fractions as well as naphtha, kerosene, jet fuel, lube oil, and the like.

In the preparation of a supported metal phthalocyanine catalyst, it is the practice to adsorb the metal phthalocyanine on an adsorptive support from a solution and/or dispersion thereof. Methanolic solutions and/or dispersions have heretofore provided a most active catalytic composite. However, methanol has become increasingly objectionable in that it is relatively expensive, toxic and difficult to dispose of.

It has now been found that when the metal phthalocyanine is impregnated on said solid assuport from a common aqueous solution and/or dispersion of said metal phthalocyanine and morpholine, a catalytic composite of improved activity results. Thus, the present invention embodies a method of preparing a supported metal phthalocyanine catalyst which comprises impregnating said metal phthalocyanine on a solid adsorptive support from an aqueous impregnating solution or dispersion of said phthalocyanine containing from about 5 to about 50 wt. ppm. morpholine.

Another embodiment of this invention concerns a method of preparing a supported metal phthalocyanine catalyst which comprises impregnating a cobalt phthalocyanine on a charcoal support from an aqueous impregnating solution or dispersion of said phthalocyanine containing from about 5 to about 50 wt. ppm. morpholine.

One of the preferred embodiments of this invention relates to a method of preparing a supported metal phthalocyanine catalyst which comprises impregnating from about 0.1 to about 10 wt. % cobalt phthalocyanine monosulfonate on an activated charcoal support from an aqueous solution or dispersion of said phthalocyanine containing from about 5 to about 50 ppm. morpholine.

Other objects and embodiments of this invention will become apparent in the following detailed specification.

The solid adsorbent supports herein contemplated include the various and well-known solid adsorbent materials in general use as catalyst supports. Preferred adsorbent materials include the various charcoals produced by the destructive distillation of wood, peat, lignite, nutshells, bones, and other carbonaceous matter, and preferably such charcoals as have been heat-treated, or chemically treated, or both, to form a highly porous particle structure of increased adsorbent capacity, and generally defined as activated charcoal. Said adsorbent materials also include the naturally occurring clays and silicates, for example, diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof, like silica-alumina, silica-zirconia, alumina-zirconia, etc. Any particular solid adsorbent material is selected with regard to its stability and to conditions of its intended use. For example, in the treatment of a sour petroleum distillate, the solid adsorbent material should not only be insoluble in, and otherwise inert to, the petroleum distillate at conditions existing in the treating zone, but also to the aqueous caustic solution typically admixed with the distillate. Charcoal, and particularly activated charcoal, is preferred because of its capacity for metal phthalocyanine and because of its stability under treating conditions. However, it should be observed that the method of this invention is also applicable to the preparation of a metal phthalocyanine composited with any of the other well-known solid adsorbent materials, particularly the refractory inorganic oxides.

The method of the present invention is applicable to the manufacture of a catalytic composite comprising any of the various metal phthalocyanines heretofore disclosed, for example, magnesium, titanium, hafnium, vanadium, tantalum, molybdenum, manganese, iron, cobalt, nickel, platinum, palladium, copper, silver, zinc and tin phthalocyanine, and the like. Cobalt phthalocyanine and vanadium phthalocyanine are particularly preferred metal phthalocyanines. The metal phthalocyanine is preferably employed herein as a derivative thereof, the commercially available sulfonated derivatives, for example, cobalt phthalocyanine monosulfonate, cobalt phthalocyanine disulfonate, or mixtures thereof, being particularly preferred. The sulfonated derivatives may be prepared, for example, by reacting cobalt, vanadium, or other metal phthalocyanine with fuming sulfuric acid. While the sulfonated derivatives are preferred, it is understood that other derivatives, particularly the carboxylated derivatives, may be employed. The carboxylated derivatives are readily prepared by reacting the metal phthalocyanine with phosgene in the presence of aluminum chloride. In the latter reaction, the acid chloride is formed and may be converted to the desired carboxylated derivative by conventional hydrolysis.

Pursuant to the present invention, the metal phthalocyanine is impregnated on the solid adsorptive support from an aqueous solution and/or dispersion of said metal phthalocyanine, said solution further containing from about 5 to about 50 wt. ppm. morpholine (tetrahydro-1,4-isoxazine). Morpholine, heretofore recognized as an effective corrosion or oxidation inhibitor, has now been found to be a surprisingly effective promoter for the metal phthalocyanine—catalyzed oxidation of mercaptans contained in a sour petroleum distillate. Morpholine concentrations in excess of about 50 wt. ppm. tend to become less effective, and the metal phthalocyanine is preferably impregnated on the solid adsorptive support from an impregnating solution containing from about 5 to about 50 wt. ppm. morpholine.

The adsorbent support can be impregnated with the aqueous metal phthalocyanine solution-dispersion in any conventional or otherwise convenient manner. In general, the support, in the form of spheres, pills, pellets, granules or other particles of uniform or irregular shape, is dipped, soaked, suspended, or otherwise immersed in the described aqueous dispersion, where the aqueous dispersion may be sprayed onto, poured over, or otherwise contacted with the adsorbent support. In any case, the excess solution is separated and the resulting composite allowed to dry under ambient temperature conditions, or dried at an elevated temperature in an oven, or in a flow of hot gases, or in any other suitable manner.

It is generally preferable to adsorb as much metal phthalocyanine on the adsorbent support as will form a stable catalytic composite—generally up to about 25 wt. %, although a lesser amount in the range of from about 0.1 to about 10 wt. % affords a suitably active catalytic composite. One suitable and convenient method comprises predisposing the solid support in a distillate treating zone or chamber as a fixed bed, and passing the aqueous metal phthalocyanine solution-dispersion through the bed in order to form the catalytic composite in situ. This method allows the aqueous solution-dispersion to be recycled one or more times to achieve a desired concentration of a metal phthalocyanine on the adsorbent support. In still another method, the adsorbent support may be predisposed in said treating chamber and the chamber thereafter filled with the aqueous metal phthalocyanine solution-dispersion to soak the support for a predetermined period, thereby forming the catalytic composite in situ.

In the sweetening process herein contemplated, offensive mercaptans contained in a sour petroleum distillate are oxidized to form innocuous disulfides in the presence of an alkaline reagent. The catalytic composite is typically initially saturated with the alkaline reagent, and the alkaline reagent thereafter admixed, at least intermittently, with the sour petroleum distillate passed in contact with the catalytic composite to maintain a desired alkaline reagent concentration thereon. While any suitable alkaline reagent may be employed, an alkali metal hydroxide in aqueous solution, for example, an aqueous solution of sodium hydroxide, potassium hydroxide, etc., is most often preferred. The solution may further comprise a solubilizer to promote mercaptan solubility, for example, alcohol, and especially methanol, ethanol, n-propanol, isopropanol, etc., and also phenols, cresols, and the like. A particularly preferred alkaline reagent is a caustic solution comprising from about 2 to about 30 wt. % sodium hydroxide. The solubilizer, when employed, is preferably methanol, and the alkaline solution may suitably comprise from about 2 to about 100 vol. % thereof. While sodium hydroxide and the potassium hydroxide constitute the preferred alkaline reagents, others including lithium hydroxide, rubidium hydroxide and cesium hydroxide, are also suitably employed.

The sweetening process is usually effected at ambient temperature conditions, although elevated temperatures generally not in excess of about 150° C. may be used. The process may be effected at a pressure of up to about 1000 psig., or more, although atmospheric, or substantially atmospheric, pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst contained therein, and the sour petroleum distillate being treated.

As previously stated, sweetening of the sour petroleum distillate is effected by oxidizing the mercaptan contents thereof to disulfides. Accordingly, the process is effected in the presence of an oxidizing agent, preferably air, although oxygen or other oxygen-containing agents may be employed. The mixture of petroleum distillate, alkaline reagent and oxidizing agent can be passed upwardly or downwardly through a catalyst bed. In some cases, the air may be passed countercurrent to the petroleum distillate. In still other cases, the petroleum distillate and alkaline reagent may be introduced separately into the treating zone.

The catalytic composite prepared in accordance with the method of this invention is both active and stable. Accordingly, the catalytic composite may be employed in a fixed bed for the treatment of large volume of sour petroleum distillate. Although the metal phthalocyanine is somewhat soluble in alkaline solution, it is nevertheless retained on the solid adsorbent support. However, in the event that any of the metal phthalocyanine is leached from the support, or otherwise carried away in the alkaline solution, it may be readily recycled in said solution for reuse in the sweetening process. However, it is in some cases desirable to introduce additional metal phthalocyanine for adsorption on the solid support in the manner herein described.

The sour petroleum distillates vary widely in composition depending on the source of the petroleum from which the distillate was derived, the boiling range of the distillate, and possibly the methods of processing the petroleum to produce the distillate. The supported metal phthalocyanine catalyst is particularly adapted to the treatment of petroleum distillates boiling in excess of about 135° C., for example, kerosene, jet fuel, fuel oil, naphtha, and the like, in a fixed bed treating system. These higher boiling distillates generally contained the more difficultly oxidizable mercaptans, i.e., the caustic insoluble, highly hindered, branched chain and aromatic thiols—especially the higher molecular weight tertiary and polyfunctional mercaptans. Although the supported catalyst of this invention is particularly applicable to the heavier petroleum distillates, it is also useful for the treatment of the lower boiling distillates such as the natural, straight run and the cracked gasolines.

The following examples are presented in illustration of certain preferred embodiments of this invention and are not intended as an undue limitation on the generally broad scope of the invention as set out in the appended claims.

EXAMPLE I

In the preparation of a supported metal phthalocyanine catalyst in accordance with the method of this invention, activated adsorptive charcoal particles were impregnated with a common aqueous dispersion-solution of cobalt phthalocyanine monosulfonate and morpholine. The dispersion-solution was prepared by diluting a 0.31 ml. sample of an aqueous morpholine solution containing about 2000 wt. ppm. morpholine, the sample being diluted to 25 ml. with water. To this 25 ml. solution was added 150 mg. of cobalt phthalocyanine monosulfonate, and the mixture was stirred to form a slurry.

The slurry was then further diluted by the addition of 100 ml. of water to provide an impregnating dispersion-solution, hereinafter referred to as solution, containing about 5 wt. ppm. morpholine, and the solution further stirred for about 5 minutes. About 100 cc of the charcoal particles, having an average bulk density of about 0.25 gm/cc and a particle size in the 10×30 mesh range, were then immersed in the impregnating solution. The solution was stirred in contact with the particles for about 5 minutes, and then maintained in contact with the particles under quiescent conditions for about 1 hour. The impregnating solution was thereafter evaporated to dryness in contact with the particles over a steam bath, and the impregnated particles subsequently oven-dried at about 100° C. for 1 hour. The catalytic composite thus prepared is hereinafter referred to as Catalyst A. Catalysts hereinafter referred to as B, C and D were similarly prepared except that the impregnating solution contained 10, 16 and 2000 ppm. morpholine respectively.

EXAMPLE II

In this example, the activated charcoal-supported cobalt phthalocyanine catalyst of Example I was prepared substantially as described except that the cobalt phthalocyanine was adsorbed or impregnated on the activated charcoal support from a methanolic dispersion thereof in accordance with prior art practice. Thus, 150 mg. of cobalt phthalocyanine monosulfonate was admixed with 50 ml. of methanol and stirred for about 5 minutes. The resulting dispersion was then further diluted to 300 ml. with methanol with an additional 5 minutes of stirring. About 100 cc of the activated charcoal particles was immersed in the methanol dispersion, and the dispersion was stirred in contact with the particles for about 5 minutes and then maintained in contact with the particles for 1 hour quiescent conditions. The methanolic dispersion was thereafter evaporated to dryness over a steam bath in contact with the charcoal particles, and the resulting impregnated particles were subsequently oven dried at 100° C. for 1 hour. The supported catalyst of this example is hereinafter referred to as Catalyst E.

The catalysts thus prepared were subjected to a comparative evaluation test. The test was effected in an air atmosphere at ambient conditions of temperature and pressure. In each case, 13.3 cc of catalyst wetted with 5 cc of aqueous 10° Baumé sodium hydroxide (pH 14) and 100 cc of a sour kerosene were contained in a closed glass vessel inserted in a mechanical shaking device. The reaction mixture was shaken in contact with the catalyst for about a 30 minute period after which the kerosene was analyzed for residual mercaptan sulfur. The catalysts were each evaluated with respect to a sour kerosene containing 164, 407 and 832 wt. ppm. mercaptan sulfur. The results appear in Table I below.

TABLE I

| Time, min. | Mercaptan Sulfur, wt. ppm. | | | | |
|---|---|---|---|---|---|
| | Catalyst A | Catalyst B | Catalyst C | Catalyst D | Catalyst E |
| 0 | 164 | 164 | 164 | 164 | 164 |
| 30 | 6 | 5 | 6 | — | 8 |
| 0 | 407 | 407 | 407 | 407 | 407 |
| 30 | 12 | 6 | 9 | 30 | 19 |
| 0 | 832 | 832 | 832 | 832 | 832 |
| 120 | 22 | 15 | 15 | 33 | 20 |

We claim as our invention:

1. A method of preparing a supported metal phthalocyanine catalyst which comprises impregnating said metal phthalocyanine on a solid adsorptive support from an aqueous impregnating solution or dispersion of said metal phthalocyanine containing from about 5 to about 50 wt. ppm. morpholine.

2. The method of claim 1 further characterized in that said metal phthalocyanine is a cobalt phthalocyanine.

3. The method of claim 1 further characterized in that said metal phthalocyanine is a vanadium phthalocyanine.

4. The method of claim 1 further characterized in that said metal phthalocyanine is a sulfonated derivative of a cobalt phthalocyanine.

5. The method of claim 1 further characterized in that said metal phthalocyanine is a cobalt phthalocyanine monosulfonate.

6. The method of claim 1 further characterized in that said metal phthalocyanine is a cobalt phthalocyanine disulfonate.

7. The method of claim 1 further characterized in that said solid adsorptive support is impregnated with from about 0.1 to about 10 wt. % metal phthalocyanine from said impregnating solution.

8. The method of claim 1 further characterized in that said solid adsorptive support is a charcoal.

9. The method of claim 1 further characterized in that said solid adsorptive support is an activated charcoal.

* * * * *